United States Patent
Rotter et al.

(10) Patent No.: US 10,861,271 B1
(45) Date of Patent: Dec. 8, 2020

(54) CHECK-IN/BE-OUT (CIBO) AND BE-IN/BE-OUT (BIBO) USING MESH NETWORKS

(71) Applicant: moovel North America, LLC, Portland, OR (US)

(72) Inventors: Matthew Rotter, Portland, OR (US); William Derocher, Portland, OR (US)

(73) Assignee: MOOVEL NORTH AMERICA, LLC, Portland, OR (US)

( * ) Notice: Subject to any disclaimer, the term of this patent is extended or adjusted under 35 U.S.C. 154(b) by 0 days.

(21) Appl. No.: 16/375,519

(22) Filed: Apr. 4, 2019

Related U.S. Application Data (60) Provisional application No. 62/655,146, filed on Apr. 9, 2018.

(51) Int. Cl.
| | | |
|---|---|---|
| G07C 9/29 | (2020.01) |
| H04B 17/318 | (2015.01) |
| G07B 15/04 | (2006.01) |
| H04W 84/02 | (2009.01) |
| G06Q 20/20 | (2012.01) |
| G01S 5/02 | (2010.01) |

(52) U.S. Cl.
CPC .............. G07C 9/29 (2020.01); G01S 5/0294 (2013.01); G06Q 20/204 (2013.01); G07B 15/04 (2013.01); H04B 17/318 (2015.01); H04W 84/02 (2013.01); *G06Q 2240/00* (2013.01)

(58) Field of Classification Search
CPC .................................................... G07B 15/04
See application file for complete search history.

(56) References Cited

U.S. PATENT DOCUMENTS

2012/0154115 A1* 6/2012 Herrala ............... G07C 9/00111
340/5.64
2017/0228953 A1* 8/2017 Lupovici ............ G07C 9/00309

* cited by examiner

Primary Examiner — Daniell L Negron
(74) Attorney, Agent, or Firm — Jones Day (57) ABSTRACT

Techniques for Check-In/Be-out (CiBo) and Be-in/Be-out (BiBo) using Mesh Networks are disclosed. In one implementation, an access control system includes a mesh network. The mesh network includes a set of mesh nodes disposed proximate to a gate to an access-controlled area and a master mesh node communicatively coupled to the set of mesh nodes. The master mesh node is configured to determine whether a device is near the gate based on a strength of a signal received at one of the set of the mesh nodes from the device. The system further includes a validator communicatively coupled to the master mesh node and a backend system. The validator is configured to: receive an indication from the master mesh node that the device is near the gate, determine, based on the indication, whether the device is authorized to enter or exit through the gate, and transmit a result of the determination of whether the device is authorized to enter or exit through the gate to the backend system.

10 Claims, 10 Drawing Sheets

FIG. 1 – mesh landscape

FIG. 2 – mesh Architecture

CHECK-IN/BE-OUT (CIBO) AND BE-IN/BE-OUT (BIBO) USING MESH NETWORKS

CROSS-REFERENCE TO A RELATED APPLICATION

The present application claims priority to U.S. Provisional Application No. 62/655,146 filed Apr. 9, 2018, the entirety of which is incorporated by reference herein for all purposes.

TECHNICAL FIELD

The present disclosure pertains to techniques for tracking and/or controlling access to a physical area. More specifically, the present disclosure pertains to techniques for tracking and/or controlling access to a physical area using a mesh network.

BACKGROUND

Transit agencies typically issue traditional paper tickets that may be validated once a rider boards a bus, train, or other transportation mode operated by the transit agency. The widespread use of mobile computing devices, such as smart phones, has provided an additional platform on which transit tickets may be issued. However, the technology for implementing such mobile transit tickets may be costly, unreliable, and inefficient.

SUMMARY

Techniques for Check-in/Be-out (CiBo) and Be-in/Be-out (BiBo) using a mesh network is disclosed. In one implementation, an access control system includes a mesh network. The mesh network includes a set of mesh nodes disposed proximate to a gate to an access-controlled area and a master mesh node communicatively coupled to the set of mesh nodes. The master mesh node is configured to determine whether a device is near the gate based on a strength of a signal received at one of the set of the mesh nodes from the device. The system further includes a validator communicatively coupled to the master mesh node and a backend system. The validator is configured to: receive an indication from the master mesh node that the device is near the gate, determine, based on the indication, whether the device is authorized to enter or exit through the gate, and transmit a result of the determination of whether the device is authorized to enter or exit through the gate to the backend system.

DETAILED DESCRIPTION

Mesh Landscape

Figure 1:
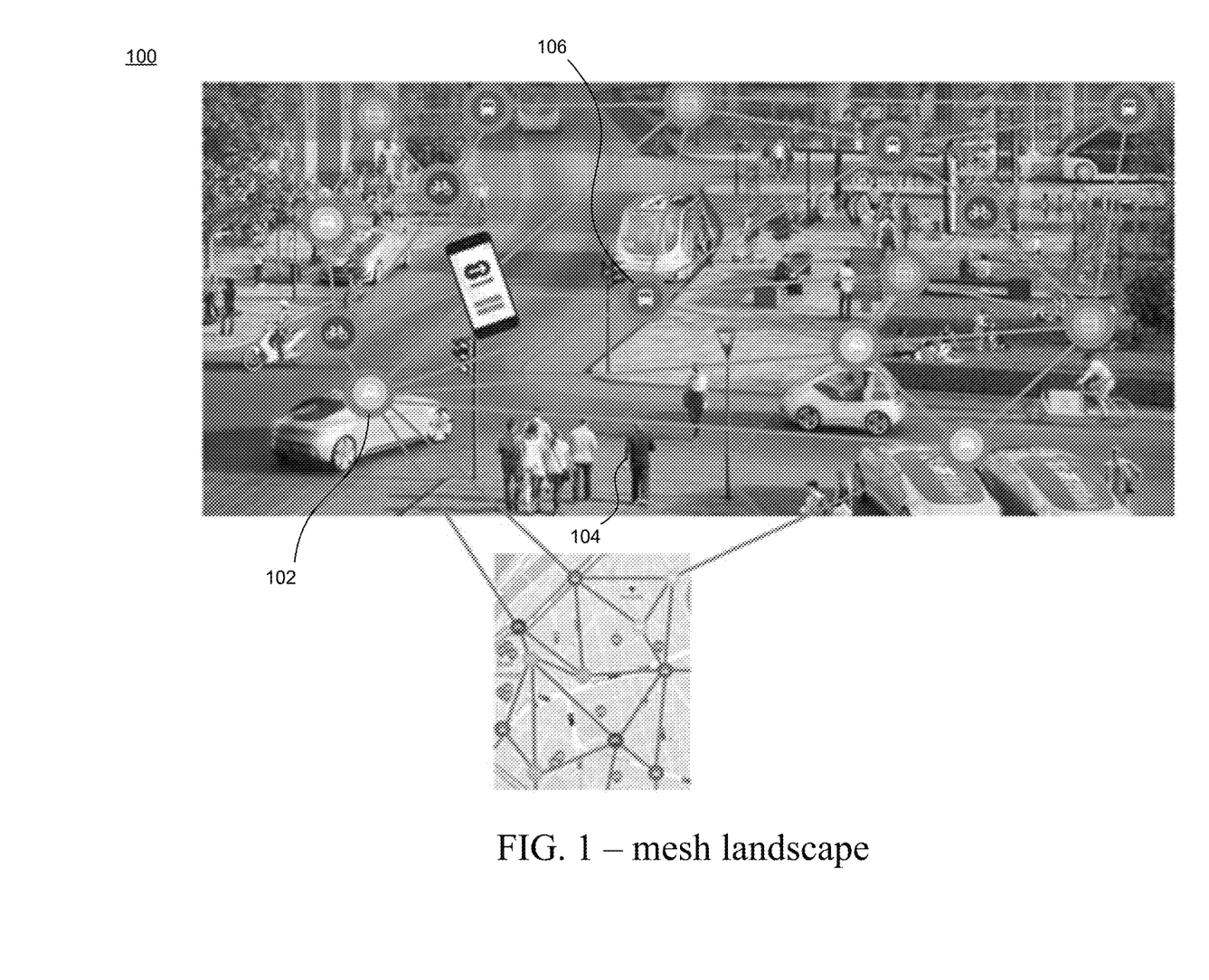
FIG. 1 illustrates an example of a mesh landscape in accordance with the disclosed embodiments.

FIG. 1 illustrates an example of a mesh landscape 100 in accordance with the disclosed embodiments. As Check-in/Be-out (CiBo) and/or Be-in/Be-out (BiBo) technologies are deployed across multiple transportation services in a city, a citywide "internet of things and devices" network may be created. Here, the "things" may be the connected vehicles 102 and platforms 106, each having an embedded validation service, and the "devices" may be mobile phones and wearables 104 operated by riders. As used herein, the citywide network may be referred to as a "mesh landscape." In this landscape, embedded validation development kits may be deployed in various parts of one or more transportation services to capture "Check-ins," "Be-ins," and "Be-outs" of rider's devices. Further, in this landscape, vehicle-to-platform, device-to-platform, and vehicle-to-vehicle communications may be possible. For example, a vehicle with an embedded validation development kit may communicate with another vehicle and/or a platform that also includes an embedded validation development kit.

In the disclosed systems, a rider may use a single digital key/identifier to access and/or pay for fare/fee in a plurality of transportation services. In particular, an embedded validation service may enable, for example, a city to provide an authenticated access and/or process payments for citywide transportation services (e.g., city buses, car sharing service, ride-hailing service, bike share, electric scooter share, and/or parking payment terminal). This does not require the city to "own" the user experience. Instead, the rider's unique identifier may be used by a plurality of transportation services so that the riders can have access to the full transportation network using their single identifier. Alternatively, or additionally, a single mobile application could be developed to share the rider's identifier and/or transit fare with a plurality of transportation services. In addition to being used on transit vehicles, an embedded validation service may be used on transit platforms (e.g., bus stops or train stations). As used herein, any transportation service utilizing the embedded validation service will be referred to as "Vehicle" and any stationary location as "Platform."

The following section outlines potential benefits of having different "things" and "devices" communicate with each other.

1. Benefit to Riders

The disclosed systems may enable a rider to use a common account that can be validated city-wide (i.e., a plurality of transportation services) without requiring that a single entity (e.g., city or an agency) own/operate all of the client applications/hardware. In some embodiments, the disclosed systems may increase the maximum rider throughput into and out of any access-controlled area (e.g., because there is no need to queue at a faregate). In some embodiments, the disclosed systems may be operable while one or more parts (e.g., rider's device) of a system is offline (e.g., disconnected from the Internet). Relevant information such as an upcoming platform/stop identifier (i.e., stopID) may be delivered offline to the device. In some embodiments, the disclosed systems may calculate a "comfort index" showing the number of riders that are in a vehicle. The index can be shared with various devices. In some embodiments, the disclosed systems may further share approximate location of riders within a vehicle. Thus, if riders are bunched in a particular car on a train and another car has a fewer riders, that information may be shared. In some embodiments, the disclosed systems may enable coordination of transfers for a rider by sharing information between vehicles (e.g., for trying to make a tight transfer).

Device-to-Vehicle Communications

In some embodiments, the disclosed systems may eliminate the need for riders to understand tariff or need to interact with fare collection system at boarding. Further, the disclose systems may allows for all-door boarding, reducing dwell time at stops, and increasing speed of service. In some embodiments, customer intervention may be required to confirm entry/exit to/from a vehicle. In some embodiments, the disclosed systems may enable "Best price" and/or "fare capping" features that can be extended city-wide based on usage across transportation options. In some embodiments, the disclosed systems may eliminate technical restrictions around vending machines. In some embodiments, the disclosed systems may allow commuters to "sleep" once they've reached their seat (e.g., in the case of reserved seating systems) without needing to show inspectors their fare. In some embodiments, the disclosed systems may enable a rider to utilize a common account and/or payment method for multiple transit services (dependent on implementation of the mesh network). In some embodiments, the disclosed systems may eliminate the need for a user's device to be online while boarding/deboarding a vehicle. In systems where a rider's trip plan is known (or is origin/destination ticket), the disclosed systems may notify/display of upcoming stop and/or display an augmented reality (AR) rendering of the whole trip, including transfers, for the rider. This feature may be especially useful for riders that are unfamiliar with the transit system.

Device-to-Platform Communications

In some embodiments, the disclosed system may enable communicate content (e.g., ads) of nearby retailers to device. The disclosed system may enable a rider's device to communicate with a system on a platform that an access lift (e.g., wheelchair access) is required by the rider. The system on the platform may, in turn, notify an upcoming vehicle that a rider needs an access lift. In some embodiments, the disclosed system may enable a vehicle to notify a system on a platform occupancy of upcoming vehicles. In turn, the system on the platform may notify riders who are on the platform (e.g., waiting for a vehicle) the occupancy of upcoming vehicles. In some embodiments, a vehicle may notify a system on a platform that an upcoming vehicle is only dropping off passengers (e.g., when the occupancy of the vehicle is at a maximum).

Vehicle-to-Vehicle Communications

In some embodiments, the disclosed system may be capable of coordinating rider pick-ups/transfers, for example, for catching a second vehicle (in a transfer scenario) and/or recommending alternate nearby modalities if delayed.

2. Benefit to Agencies/Cities

In some embodiments, the disclosed systems may enable agencies to implement distance or zone based fares without requiring users to tap-on and tap-off. These are generally considered more equitable fares, but aren't adopted by agencies because they are more expensive to implement and are confusing for riders. By moving the fare requirements to the system, agencies may be able to implement more complicated fare structures with minimal cost and few requirements on the riders. In some embodiments, the disclosed systems may reduce unintentional fraud since the entry and exit can be captured without a rider's intervention. This decreases revenue loss due to accidental fraud. In some embodiments, the disclosed systems may be more difficult to defeat/abuse since the 'root of trust' is on the network, not the user's device. This decreases the number of client fraud vectors.

In some embodiments, the disclosed systems may automate and improve data collection around the following points: Multi-modal Trips, Travel Behavior (Timing and Routing), Per-Vehicle Passenger Density, Unlinked Passenger Trip Counts (UPT), Passenger Miles Traveled (PMT), Transfers, and Rider behavior and movement within Transit Stations. In some embodiments, the disclosed systems may be further capable of performing cognitive modeling to provide a full picture of the Rider's citywide transportation needs; deriving the "home" and categorizing the "destination" locations of the Rider; understand the distance, commute times and mode of traveling to/from "home" and "origin" platform and/or final "destination" and "destination" platform; develop a near real-time origin-destination model to inform future transportation planning; understand Riders willingness to utilize different forms of transportation dependent on metrics such as distance, time, and weather; and understand how Rider behavior changes after implementation of new fare policies.

Device-to-Vehicle Communications

In some embodiments, the disclosed system may be capable of collecting real-time data that can be used for route/service planning and modeling. The collected data may include, for example, origin/destination, transfers, type of entitlement, customer information. In some embodiments, the disclosed system may enable cities/agencies to introduce more equitable fares which are historically discarded due to complexity (ex: zones, distance, time based, transfers). In some embodiments, the disclosed systems may enable cities/agencies to collect data that can be used to understand vehicle-capacity utilization along with customer-type utilization (e.g., based on rider class). In some embodiments, the disclosed systems may enable cities/agencies to collect data that can be used to understand changes in customer behavior over time (e.g., when changes are introduced to the system). The disclosed systems may be capable of capturing Passenger Miles Traveled (PMT) and Unlinked Passenger Trips (UPT) data, which can be compared against the Federal Transit Administration (FTA) National Transit Database (NTD) collection methods. In some embodiments, the disclosed systems may perform at least some, if not all, of validations on agency/city owned hardware, thereby reducing fraud vectors originating from validation devices. For example, root of trust for all validation may be on agency-owned hardware, reduces fraud vector from the device. In some embodiments, the disclosed systems may enable inspectors to view which riders have validated their fare thru the CiBo/BiBo network (e.g., in a reserved seating system). In some embodiments, the disclosed systems may not require the device or embedded validation kit to be online to "check-in" or "be-out" a rider.

Device-to-Platform Communications

In some embodiments, the disclosed systems may be capable of calculating a more accurate wait times at platform. In some embodiments, the disclosed systems may be capable of determining a number of people on a platform, and based on the determined number of people, predict vehicle occupancy for subsequent platforms. In some embodiments, the disclosed systems may be capable of capturing "be-outs" by identifying devices that are still connected to the platform's system after a vehicle leaves the platform.

Vehicle-to-Vehicle Communications

In some embodiments, the disclosed systems may be capable of providing alternative options to a rider if the current vehicle is unable to service the rider. In some embodiments, the disclosed systems may be capable of reducing transfer wait times for riders.

3. Benefit to Third-Party Vehicle (MaaS System)

In the disclosed systems, transit benefit funds can be applied to third-party service providers. In some embodiments, the disclosed system may also enable a third party to have visibility into transfers to/from public transit services and other transit modalities. In some embodiments, the disclosed systems may enable offline authentication of riders entering the vehicle, thereby providing increased security to both the driver and Rider. In some embodiments, the disclosed systems may increase the throughput of riders through coordinated pick-up and/or transfer recommendations.

Device-to-Vehicle Communications

In some embodiments, the disclosed systems may lower psychological barriers to utilize other transportation options by enabling a rider to utilizing the same payment method(s). For example, a rider can use a common account to board vehicles associated with a plurality of transit systems.

In some embodiments, the disclosed systems may enable riders to utilize transit benefits from employers/schools (e.g., through portals).

Can have visibility into transfers to/from public transit services and other transit modalities In some embodiments, the disclosed systems may enable riders entering a vehicle to be authenticated, providing increased security. The disclosed systems may represent a low cost/small footprint/low energy/easy-to-install hardware solution. The disclosed systems may not require the device or embedded validation kit to be online.

Device-to-Platform Communications

In some embodiments, the disclosed systems may be capable of recommending nearby options if wait times are delayed and/or if occupancy of upcoming vehicle(s) are high.

Vehicle-to-Vehicle Communications

In some embodiments, the disclosed systems may receive riders through coordinated pickup and/or transfer recommendations.

Mesh Network

Figure 2:
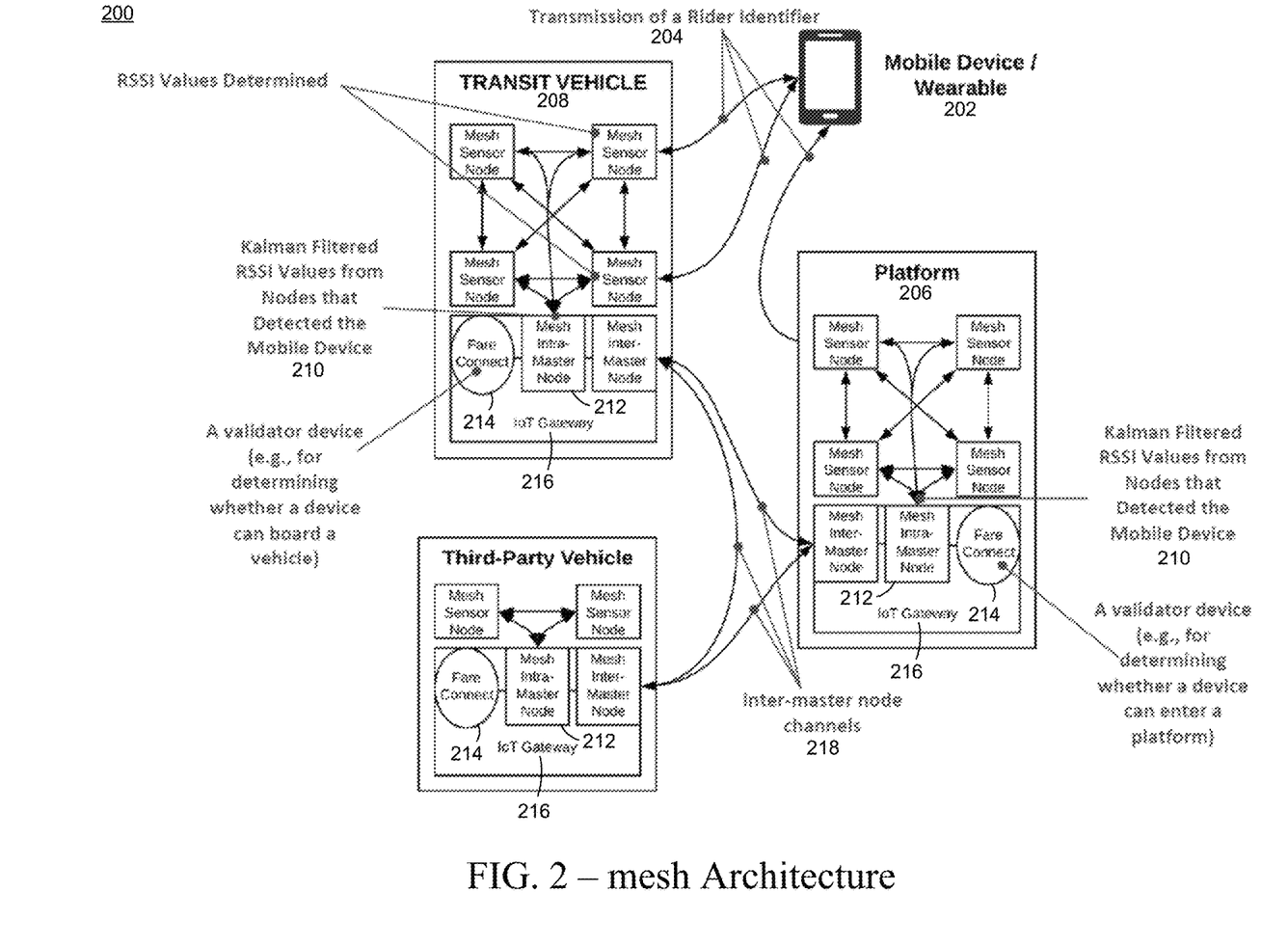
FIG. 2 illustrates an example of a system that uses mesh networks in accordance with the disclosed embodiments.

FIG. 2 illustrates an example of a system 200 that uses mesh networks in accordance with the disclosed embodiments.

In the discloses systems, a rider may operate a mobile device 202 executing a "mobility app," which stores a unique rider identifier 204 associated with the rider. When the rider moves to a location where a mesh network is deployed (e.g., in a platform 206/vehicle 208), the rider's identifier is sent from the mobile device to the mesh network, for example, using contactless protocols/technologies. In some embodiments, the mesh network may include multiple mesh nodes. On larger transit vehicles, nodes may be concentrated around one or more doors to capture boarding/alighting.

A signal strength 210 (e.g., received signal strength indicator (RSSI)) of the mobile device may be measured at, or by, the nodes in the mesh network. In one example, the signal strength and account number may be wirelessly transmitted to a Bluetooth node by the mobile device. The node may then share that information with an intra-master node 212 of the mesh network. Subsequently, the intra-master node determines whether the user is within the entry/exit area of a platform/vehicle. If the user is in the entry/exit area, the intra-master node sends the user's account information to a validator 214 via an IoT gateway 216 (e.g., for Ethernet network access). In some embodiments, the master node 212, the validator 214, and the IoT gateway 216 may be consolidated into a single, small footprint device. When the validator receives the account information, the account information is processed in the same manner as a physical tap on the validator device (e.g., when a mobile device displaying a digital ticket/token is scanned at the validator). A mesh network on a vehicle may communicate with other mesh networks through one or more inter-master node channels 218 formed between the mesh networks. Accordingly, the inter-master node can share information between vehicles and between a vehicle and a platform, and between platforms.

In the disclosed systems, an intra-master node may decide whether the user has passed through an entry/exit area by examining the RSSI from the nodes in the same network. A neural network may be utilized to compute the decision. Training the neural network may be equivalent to fingerprinting the RSSI readings from the nodes around the entry/exit area. Once trained, the neural network may make decisions about RSSI readings presented to the nodes based on past (a priori) information.

Figure 3:
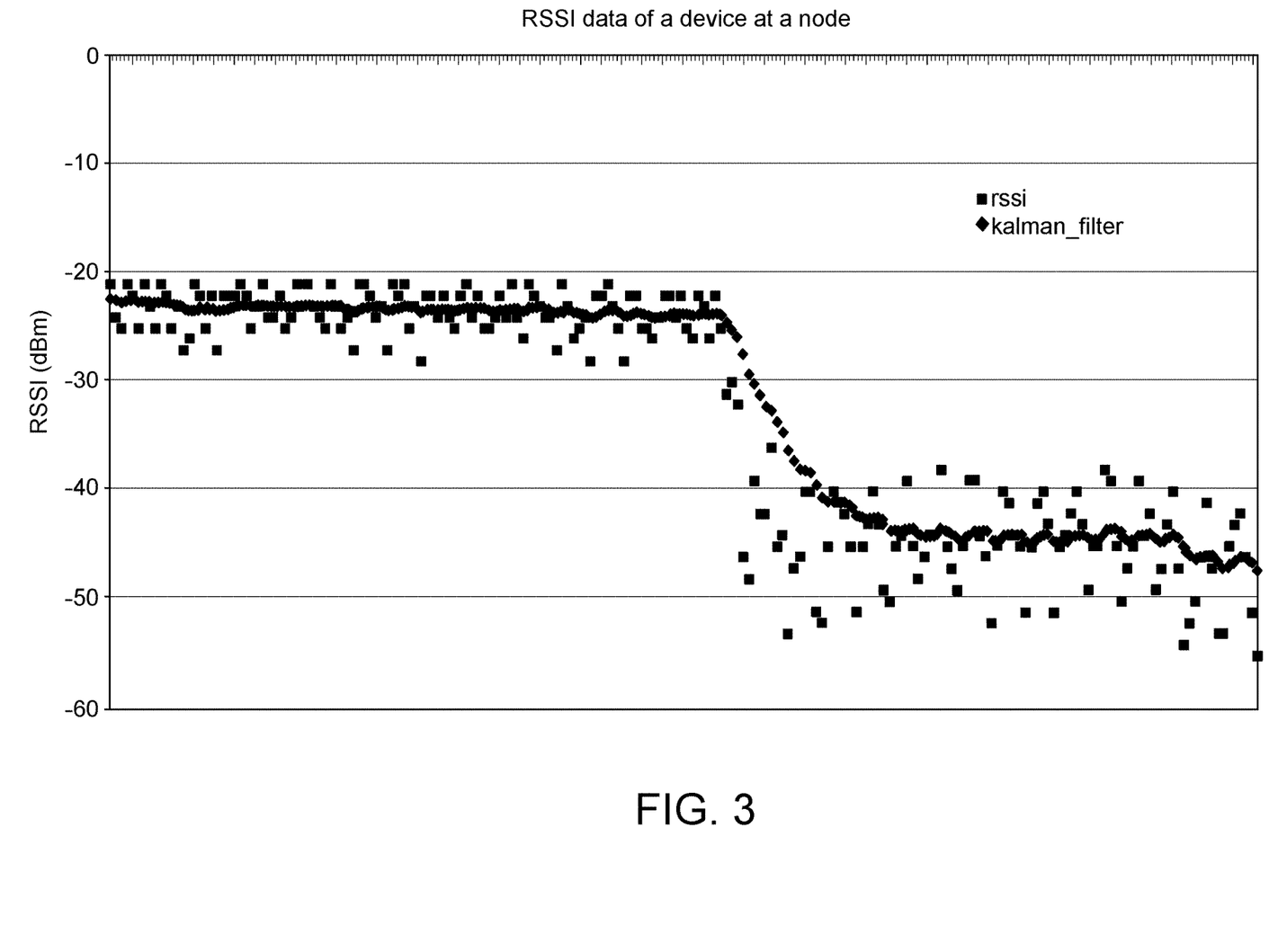
FIG. 3 illustrates a graph of a device's RSSI values at a mesh node in accordance with the disclosed embodiments.

FIG. 3 illustrates a graph of a device's RSSI values at a mesh node in accordance with the disclosed embodiments. In FIG. 3, the device is moved from one position to another, and the mesh node applies a Kalman filter to the collected RSSI data. The filtered data is subsequently sent to the intra-master node. As shown in FIG. 3, the RSSI values have a large variance even when the device's position is static. Thus, a Kalman filter may be used to reduce/smooth the variance. The filter's smoothing ability may be reduced slightly in exchange for an increased response time.

Systems that use mesh networks may provide several advantages over systems that use beacons. A typical beacon-based implementation may use one beacon per vehicle, thus limiting the distance calculations to the general vicinity of the beacon. The single beacon also represents a single point of failure. Further, in such an implementation, a rider's device performs the distance calculations, which burdens the device's processing power. While more beacons may be used to establish the proximity of the device, the additional calculations may cause the device battery to drain faster.

Furthermore, a device in beacon-based systems may be the sole point of validation for bus drivers (i.e. user must show the phone to the driver when boarding). This may result in a higher fraud risk. Moreover, a validation may only occur on the rider's device, and not on devices owned by the transit system. Thus, the system must trust the rider's device. In addition, all data transfer may occur on the rider's device, which may be a problem for users with limited data plans. Furthermore, a beacon-based system may not allow the device to function without a connection to the internet.

An Example of a System

The following system may be deployed on an account-based/mobile ticket based system and/or a truth-on-card/device system. In the case of an account-based system, stored value and passes may be stored in a cloud-based system and the card/device may only pass an account identifier. In the case of a truth-on-card/device system, all fare information may be passed.

FIGS. 4-7 illustrates examples of a system that uses mesh networks in accordance with the disclosed embodiments.

Check-In Processes

Figure 4A:
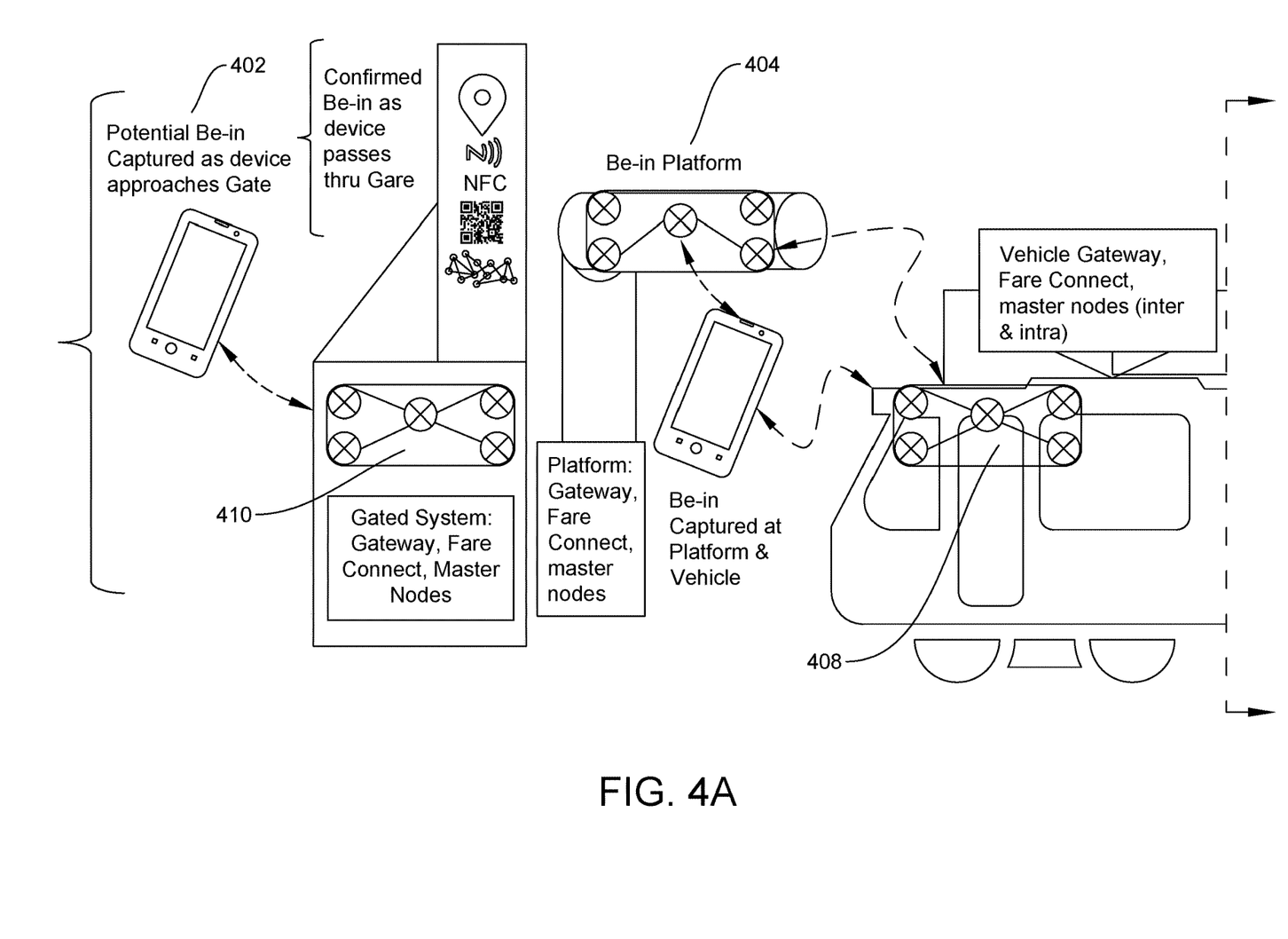
FIGS. 4A and 4B illustrate examples of a system that uses mesh networks in accordance with the disclosed embodiments.
Figure 4B:
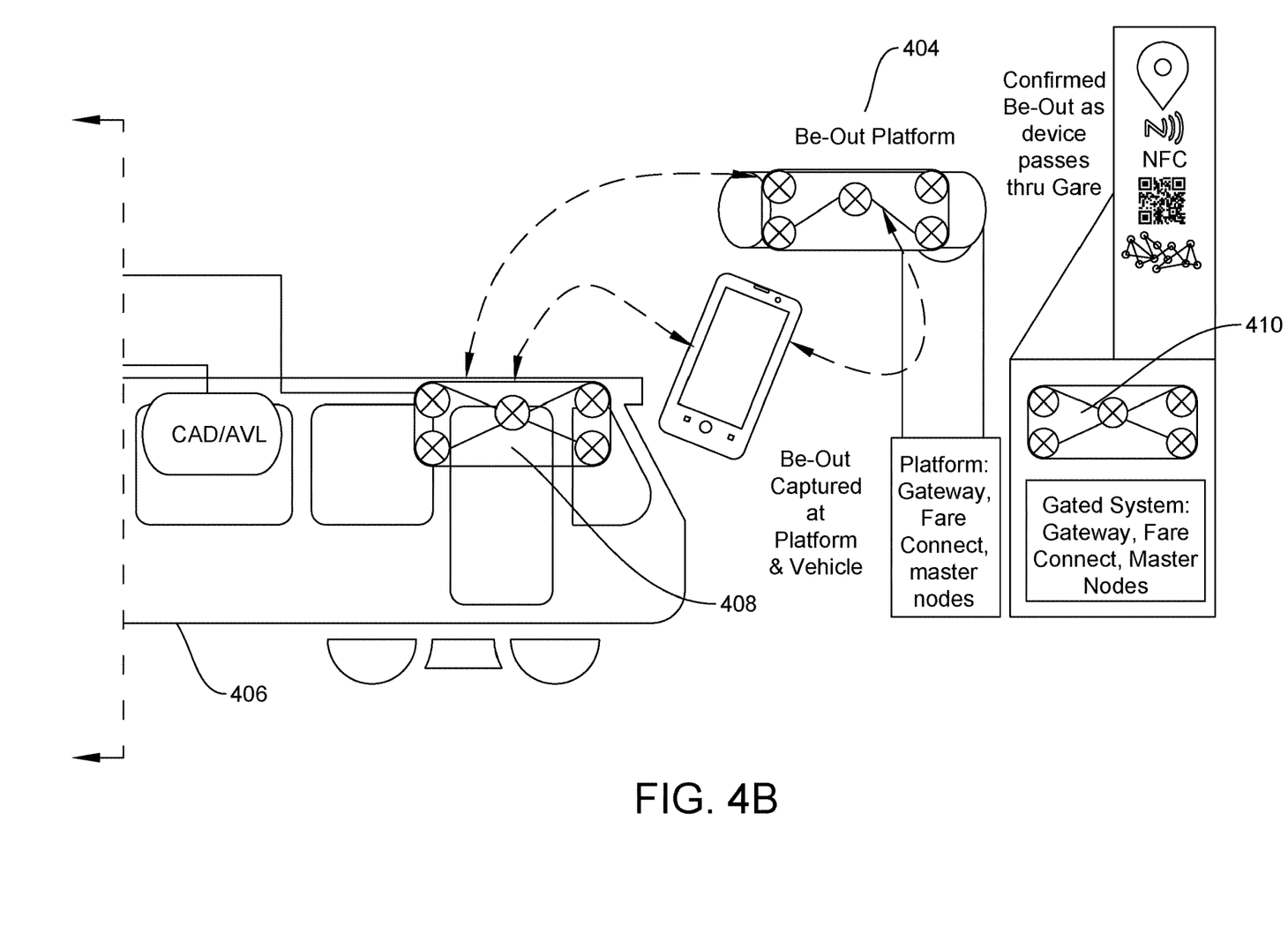
Figure 5:
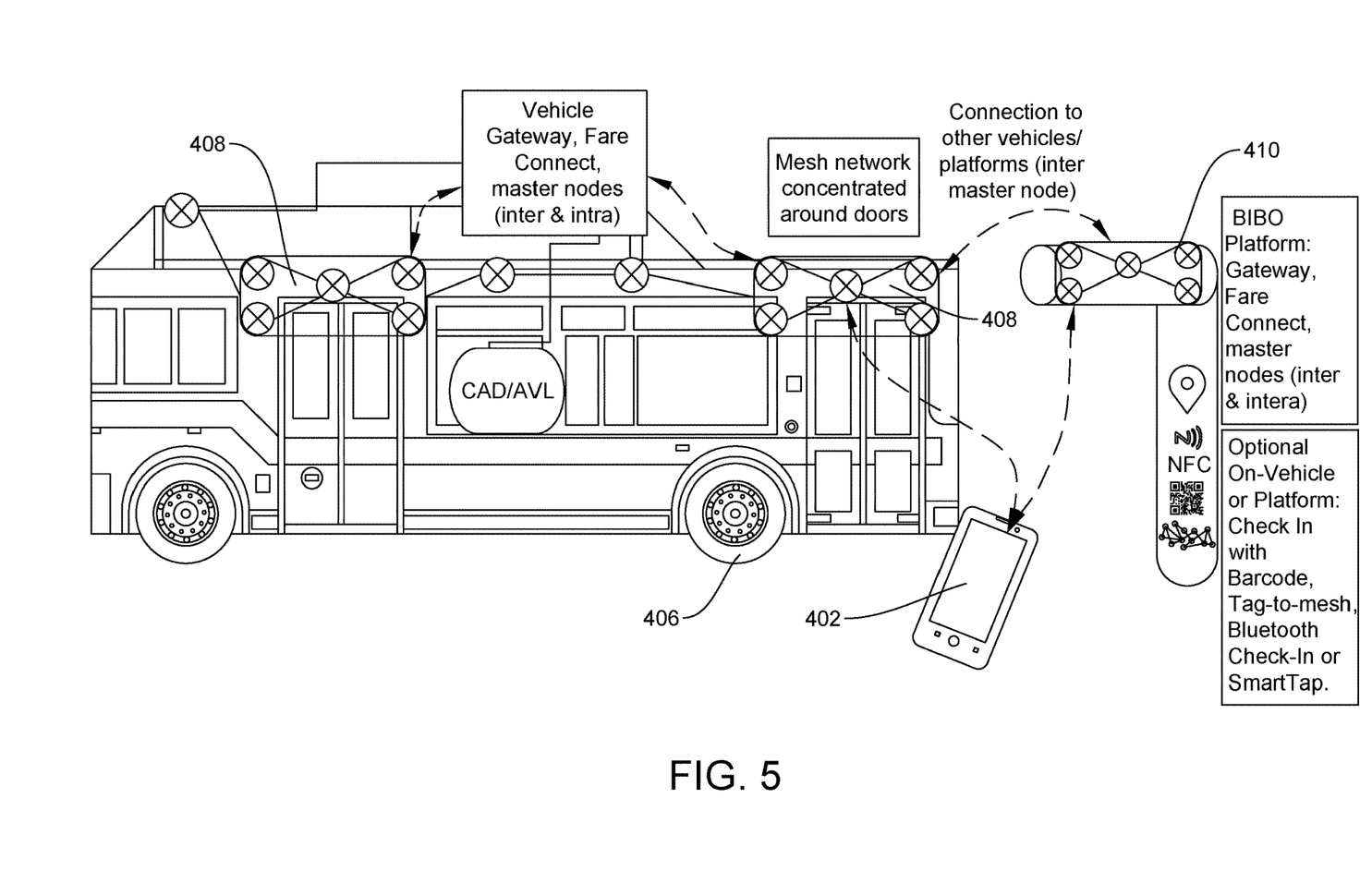
FIGS. 5-7 illustrates examples of a system that uses mesh networks in accordance with the disclosed embodiments.
Figure 6:
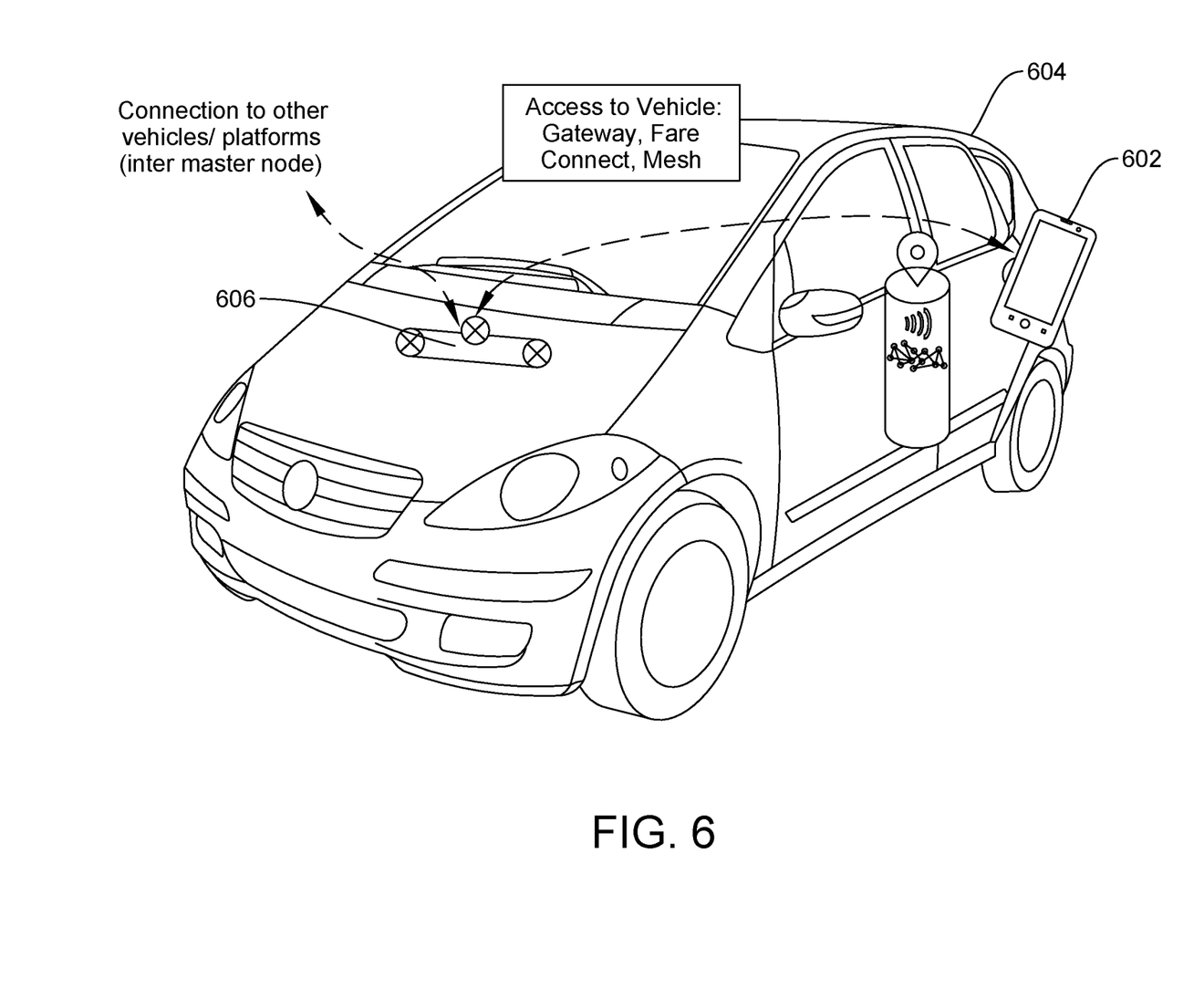
Figure 7:
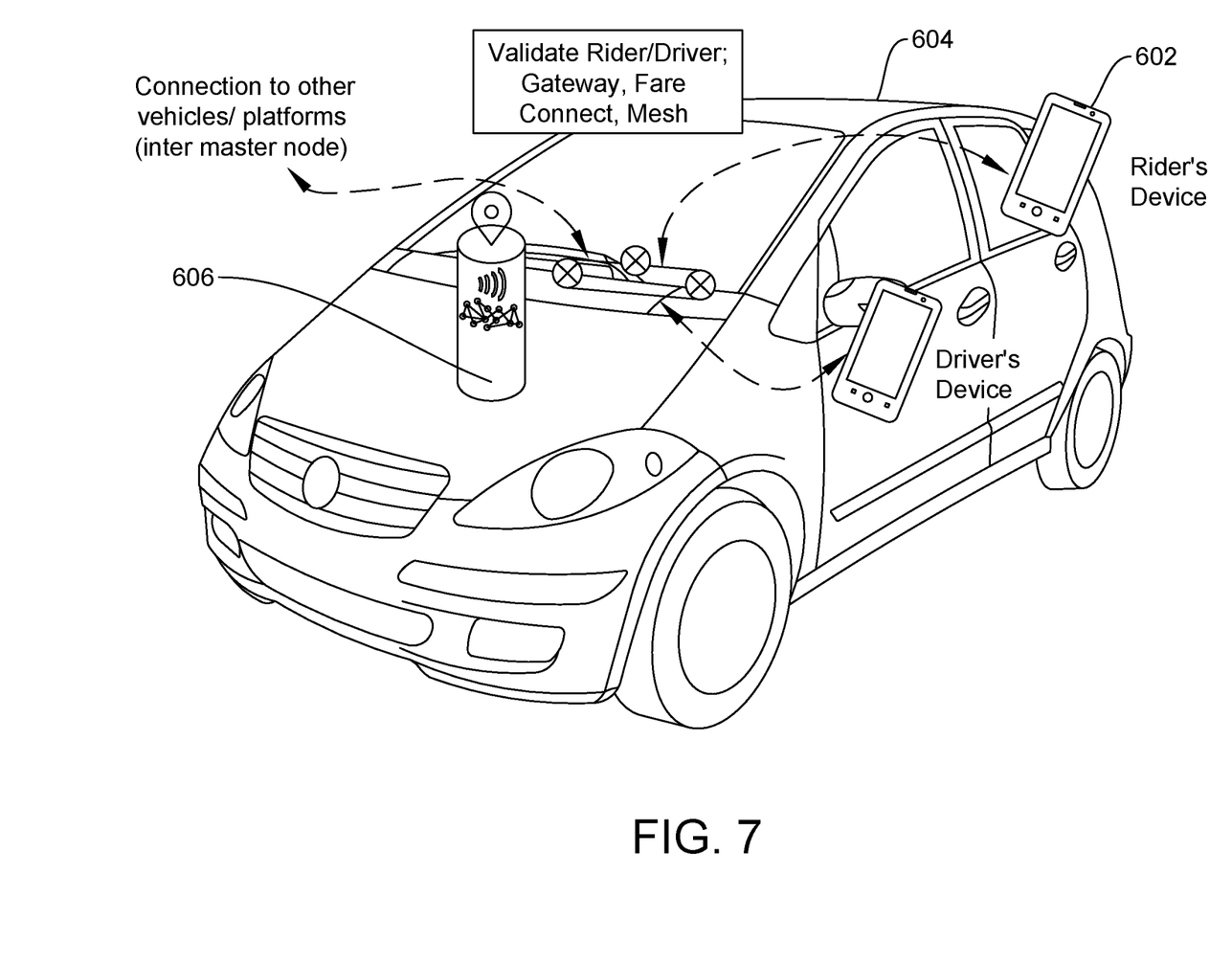

An origin of a trip can be captured using a "check-in" methodology where a transit account identifier or a ticket is passed to a validator, for example, using a barcode. Alternatively, in a "Be-In" environment, one or more of the following three scenarios may occur:

Scenario 1 (see FIG. 4)—A rider's device 402 comes in proximity of a platform's mesh network 404. The device connects via Bluetooth to the mesh network 404. The device passes its account identifier or fare and any relevant information to the mesh network (e.g., including a request to have the approaching vehicle on a particular route lower the access/wheelchair lift). When the vehicle 406 arrives at the platform, the device is tracked as it moves from the platform's mesh network 404 onto the vehicle's mesh network 408. As the device passes through the concentrated mesh nodes around the entrance, a "be-in" is captured. The "Be-In" is confirmed once the vehicle leaves the platform (i.e., the device is no longer connected to the platform's mesh network and the device maintains a connection with the vehicle's mesh network).

Scenario 2 (see FIG. 4)—A rider's device 402 comes into proximity of a gated system 410. As the device 402 comes into proximity of the gated system 410, the device connects with the mesh network as a potential "Be-In" and shares its account identifier and/or fare information. Once the device is in an access controlled area (e.g., in a vehicle or on a platform), the "Be-In" is captured in real-time and communicated back to the Rider. In some embodiments, the gated system may include an electrically-controlled barrier (e.g., electrically controlled door) and the validator is further configured to cause actuation of the barrier to open or close based on the result. In some embodiments, the gated system may include an electrically-controlled barrier (e.g., swivel) and the validator is further configured to cause actuation of the barrier to lock or unlock based on the result. In some embodiments, the gated system may include a light (e.g., warning red light and/or a green light) and the validator is further configured to cause the light to turn on or off based on the result.

Scenario 3 (see FIG. 6)—Once a rider selects to engage with a third-party vehicle, the Be-in is captured. Capturing a "Be-in" could be handled through a native application (e.g., as simple a way as selecting a "Book Now" or "Request TNC" button). When the device 602 comes into proximity of a third-party vehicle 604 (ex: bike-share, ride-share, ride-hailing), the device connects to the mesh network 606 on the third-party vehicle (see e.g., FIG. 6). Messaging is communicated back to the user through the app confirming the actual "Be-in." In some embodiments, a set of mesh nodes may be placed near the driver side of the third-party vehicle and another set of meth nodes may be placed near the passenger and/or rear sets of the third-party vehicle. In these embodiments, the mesh nodes may be used to determine where the rider's device is located within the third-party vehicle (see e.g., FIG. 7).

As the rider travels through the transit system, the mesh network(s) may monitor the progress and location of the rider. The platform/stop identifiers may be rolling on the validator based on progress of a bus, and this information may be passed to the mesh network. The mesh network then passes the location information to the mobility app through the Bluetooth connection.

Be-Out Processes

After the rider disembarks from vehicle and/or leaves the vicinity of the platform, the mesh network captures the exit event. In a tariff-based use case, the validator utilizes the Be-Out to calculate the cost of the trip utilizing the Origin/Destination pair and then communicates this to the mesh network. In the case of a data collection use case, the validator utilizes the Be-Out to communicate the disembarkment to the mesh network.

Subsequently, the validator sends a validation result to the mobile device. In the case of a bus or open access system, the riders may exit a vehicle to allow other riders to deboard. As a user passes through the access controlled area a "be out" is captured, however a slight delay could occur before the final "be out" is confirmed and sent to the backend system to guarantee that the rider has actually left the vehicle. The user's device could communicate a warning/question if the network was unsure if they were permanently or temporarily off the vehicle. Through any of these stages, once the approved redundancy threshold has been met, the mobile device sends an acceptance message to the user (for example, the device may vibrate). In the case where the system is gated, a validator displays that the Be-Out was validated to the user (i.e., the user would pass through an open gate and have a visual showing they're valid).

Another Example of a System

Figure 8:
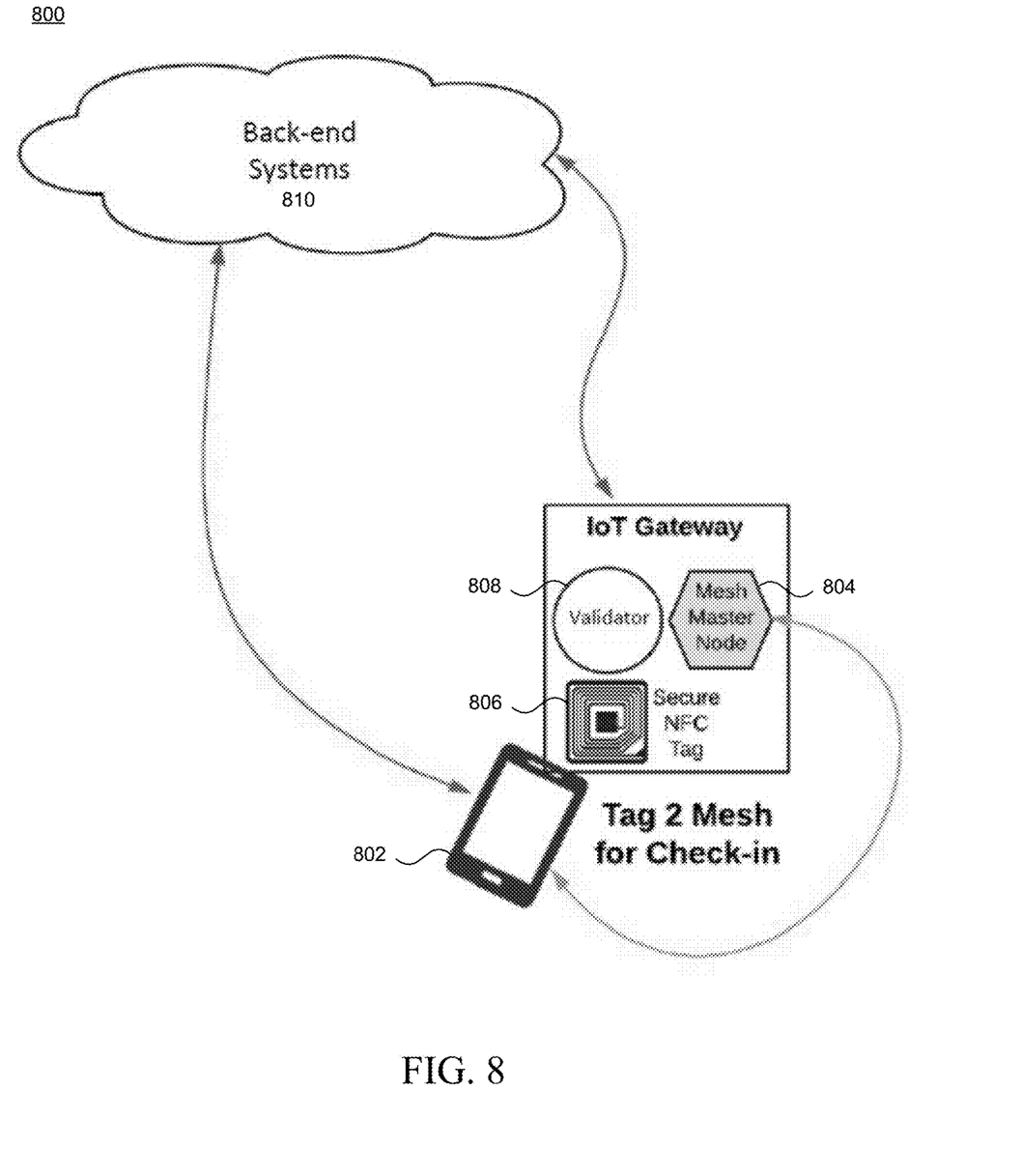
FIGS. 8-9 illustrates examples of a system that uses mesh networks in accordance with the disclosed embodiments.
Figure 9:
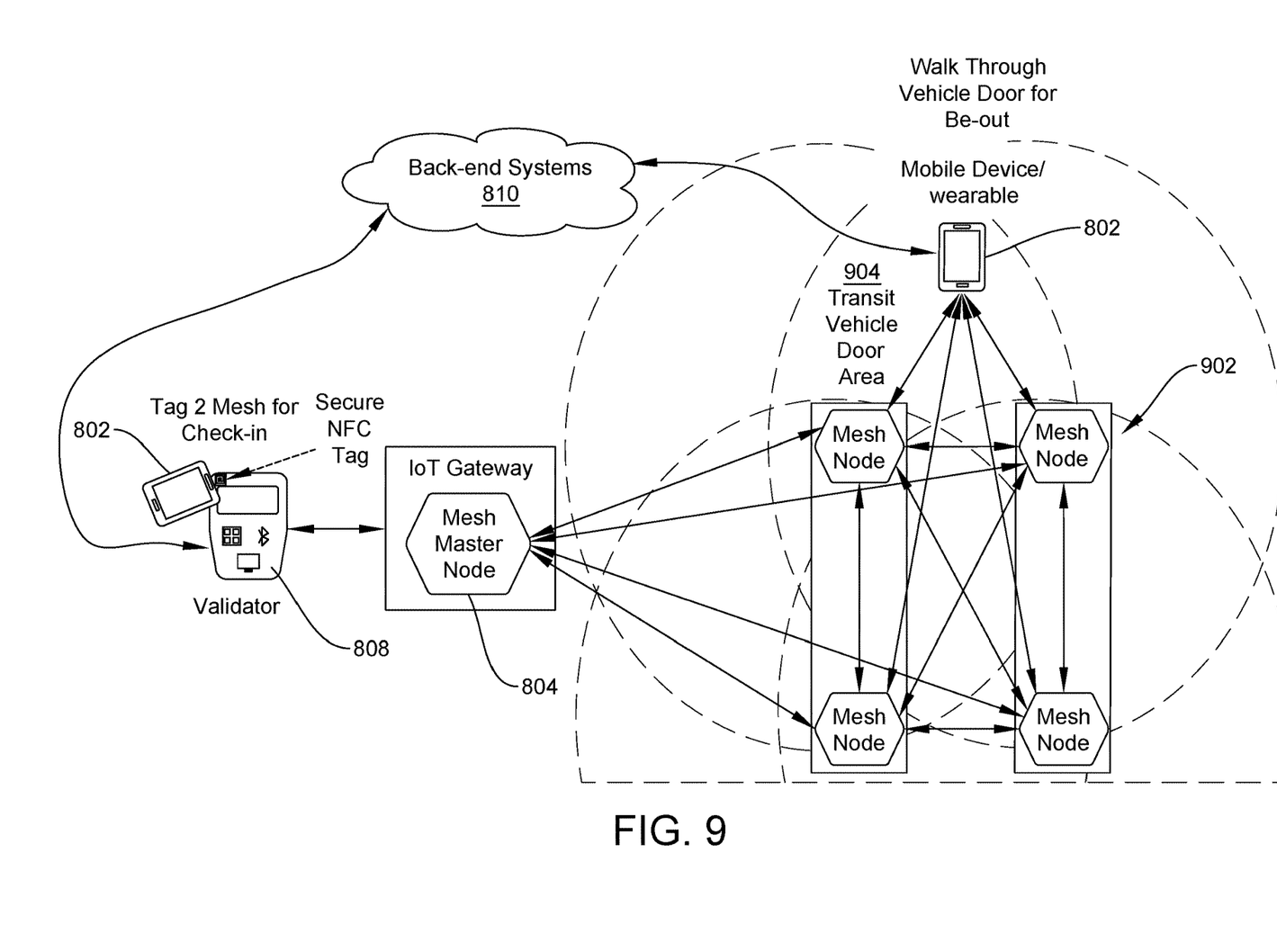

FIGS. 8-9 illustrates examples of a system 800 that uses mesh networks in accordance with the disclosed embodiments.

When a rider launches a mobility app on a mobile device 802, the application may scan for mesh nodes and attempt to connect to an appropriate mesh network 902 if it is in range. An NFC tag 806 (e.g., placed near an entrance to a vehicle/platform), when scanned by a mobile, device 802, may trigger the mobile device to provide, to the mesh nodes 902 (i.e., mesh network), appropriate information that may be needed to validate the rider when boarding the vehicle. When the rider approaches a vehicle door 904 to alight a vehicle, the Bluetooth mesh network 902 may use Real Time Location Services (RTLS) to track the smartphone 802. Once the rider is in the alighting zone, the rider information will be provided to the Bluetooth mesh network to record the departure.

Check-in Process

During the Check-in, a ticket, pass, or account based stored value virtual card may be used to board the vehicle. For example, a rider may select a virtual card on a smartphone 802, and place the smartphone's NFC antenna on an NFC tag 806. The NFC tag 806 may be a passive secure tag with static data. In some embodiments, the NFC tag 806 may use an active tag with dynamically configurable data. The NFC tag data may Include a unique agency identifier and transit mode (e.g., fixed route, on-demand, ride-hailing, car-sharing). The mobility app may use the agency identifier to ensure it is connected to a correct mesh network and the transit mode to determine the available pass or ticket products.

Subsequently, the mobility app 802 passes the rider information to the mesh network. In some embodiments, the rider information may contain the account identifier. In some embodiments, the rider information may further include Mobility App ID, GPS, a timestamp representing a time the virtual card was launched, card ID, and card value.

The mesh network may include a single node or multiple nodes. When the rider information is passed to a mesh node, it is then relayed to the master node 804 over one or more hops. In some embodiments, the master node may be a part of the gateway. Subsequently, the data may be sent from the gateway (or the master node) to a validator 808. In some embodiments, the validator may be a part of the gateway, which may serve as a low-cost validator. The validator 808 may process the rider information with the local validator data to determine if the rider can board the vehicle. The original rider information, validator data, and validation results are then sent to the back-end systems 810 for further processing (e.g., recording that a device has boarded a vehicle).

Be-Out Process

After the check-in, the rider will eventually exit the vehicle. In order to capture the location information when the rider exits the vehicle, a be-out bluetooth mesh system may be deployed. The system may include, for example, four mesh nodes installed on the sides of a vehicle doorway. The rider may need to leave the Mobility App executing in the foreground or background for the Be-out detection to function. The smartphone can be in a standby or active state.

As the rider approaches the doorway, the Mobility App may scan and connect to the bluetooth mesh nodes near the doorway. In some embodiments, the Mobility App may periodically send bluetooth advertising packets to the mesh network. The mesh nodes may read the RSSI values and send them to the mesh master node 804. The mesh master node 804 may add the RSSI values from each mesh node to, for example; a table with the timestamp. This data may be processed by a Kalman filter and a shallow neural network. When the confidence is sufficiently high that the rider has passed through the doorway; the master mesh node 804 may send an acknowledgement to the Mobility App through the mesh nodes. The master node 804 will also send the account ID from the Mobility App that exited to the validator 808, which in turn sends the account ID to the back-end systems 810 for further processing (e.g., recording that a device has exited a vehicle).

Data Analytics for Transportation Modeling and Planning

Agencies follow strict data reporting guidelines to submit ridership information to the National Transit Database (NTD) to receive federal funding. Automated Passenger Counters capture riders' trips, but these systems have to be certified by the Federal Transit Administration (FTA) and go through regular maintenance to qualify for use in the NTD reports. Two critical metrics include: Unlinked Passenger Trips (UPT) and Passenger Miles Traveled (PMT). Many agencies rely on manual sampling for UPT and all flat-fare systems rely on manual counting and surveys to capture PMT. Thus, agencies may send ride-checkers out to manually count people and survey for origin/destination. The CiBo and BiBo enabled by the mesh network(s) provide transit agencies with data that can be compared against their UPT and PMT measurements.

In some embodiments, data collection through the mesh network(s) enables a central system to engage in cognitive computing to process the data, and then model transit networks and simulate rider throughput. Processing data collected through the mesh network(s) could demonstrate to transit agencies a broader perspective of their ridership base for improved transit planning, service planning and real-time communication. For example, using the CiBo/BiBo data, geolocation data, gyroscope and additional macro-data, the central system may infer/generate the following information:

Destination and Origin Information

Assuming most people travel in a pattern from home to their destination and vice versa, for example the standard 9:00-5:00, or a weekend swing shift, over time a pattern would emerge in the travel behavior. This could distil the origin or "home" stop of a rider. If a rider had multiple destinations, for example "A" to "B", "A" to "C," and "A" to "D", "A" could be specified as the "home" and all other locations would be inferred over time based on zoning/mapping data and the duration of time a user spent there along with user demographics. For example "work," "school," "daycare," "medical," "pharmacy," "shopping," "entertainment," "recreation," etc. could be inferred by frequency of trips per month, time of day and duration of time at the location along with zoning/mapping data of the location.

Geolocation coordinates for the rider's actual home location would be discoverable through drop-offs from ride-hailing trips and/or captured through the device's ability to gauge walking/driving home after traveling on transit.

Origin and destination stop are captured by the actual CiBo or BiBo technology at the platforms and vehicles. Currently this information is segmented to the organization providing the transportation service. In the mesh network, all services would be interconnected, providing a true picture of Rider's travel patterns. Taking transit to the bar and then hailing a ride home would show the end-to-end round-trip even though two different services were utilized.

This information is used to build a city-wide origin/destination (OD) distribution model to estimate service, route and stop level probability of transit usage over time. The OD model from the mesh network combined with land-use data would provide Agencies and third-parties with a more detailed picture to optimize planning around stop locations, frequency and timing of vehicles as well as services to offer and infrastructure around those services.

A Major Intersection Closest to a Rider's Home

Once the "home" is identified for the rider that geolocation can be mapped to determine what major thoroughfares are closest to the Rider's home. This is used in the OD model to better understand how far a Rider's home is from different transportation options. It can also be used to gauge Rider behavior in relation to transportation.

Travel Time to a Platform and Destination

If the app is running in the background, we can capture information on how the Rider commuted to/from their transit platform or vehicle (in the case of car-sharing/ride hailing). The distance, duration and time of day, overlayed with maybe a weather index will help create an allowable distance metric around commuting from the "home" or "final destination" to the platform.

This will also help demonstrate Rider behavior. For instance, do users in a particular neighborhood not walk to the platform, but rather get dropped off. Or does time of day impact how far or with what modality a Rider is willing to commute to a platform.

Information such as walking, biking, driving, etc. will help determine what infrastructure is needed around a platform. This can support funding for bike parking, improved sidewalks, park-and-rides, etc.).

Method of Fare Payment/Identification of Fare/Travel History

Fare information layered on top of travel information will provide additional context around likelihood of transit service utilization dependent on fare selection. Do monthly pass purchasers behave differently than daily pass purchasers. Do Riders who receive subsidized transit benefits through their school or work utilize transit differently? Does changing the fare structure influence how users interact with the system? Providing Agencies and third-party services with more information about how Riders are paying for their fare and how services are utilized will help them make more informed decisions around funding, infrastructure planning, service planning and fare policies.

Finally, based on this information, the mesh network could calculate approximate UPT and PMT for Agencies and third-parties. The digitally collected data would be compared against the manually sampled data to provide an accuracy confidence.

At some point the FTA may expand their funding program to provide subsidiary funding to some approved third-party on-demand services. In this scenario, those service could also provide their UPT and PMT counts using the mesh network.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An access tracking system, comprising:
   a mesh network including (1) a set of mesh nodes disposed proximate to a passageway for entering or exiting a transit vehicle and (2) a master mesh node communicatively coupled to the set of mesh nodes, wherein:
   the master mesh node is configured to determine whether a mobile device has become located near the passageway based on a strength of a signal received at one of the set of the mesh nodes from the mobile device; and
   a validator communicatively coupled to the master mesh node and a backend system,
   wherein the validator is configured to determine whether a user of the mobile device is entering the transit vehicle by:
   (1) receiving an indication from the master mesh node that the mobile device is near approaching the passageway, wherein the mobile device communicates and account information associated with the mobile device user, and the user account information is transmitted to the validator via an IoT network,
   (2) determining, based on the indication, whether the user of the mobile device is entering the passageway by applying detected signal strength values associated with the mobile device to a Kalman filter, and
   (3) transmit a result of the determination of whether there is a be-in associated with the mobile device for the backend system to starting the computation of a transit fare for the user of the mobile device; and
   wherein the validator is configured to determine whether a user of the mobile device is exiting the transit vehicle by:
   (1) receiving an indication from the master mesh node that the mobile device is near the passageway, wherein the mobile device communicates and account information associated with the mobile device user, and the user account information is transmitted to the validator via an IoT network,
   (2) determining, based on the indication, whether the user of the mobile device is exiting the passageway by (i) applying detected signal strength values associated with the mobile device to a Kalman filter and (ii) applying a redundancy threshold to confirm that the user of the mobile device departed the vehicle, and
   (3) transmitting a result of the determination of whether there is a be-out associated with the mobile device for the backend system to determine a transit fare for the user of the mobile device.

2. The system of claim 1, wherein the mesh network additionally includes a set of mesh nodes disposed proximate a gate to an access controlled area, and the gate includes an electrically-controlled barrier and the validator is further configured to cause actuation of the barrier to open or close based at least in-part on a result of determining whether a mobile device has become located near the gate based on a strength of a signal received at one of the set of the mesh nodes from the mobile device.

3. The system of claim 2, wherein the validator is further configured to cause the barrier to lock or unlock based on the result.

4. The system of claim 2, wherein the gate includes a light and the validator is further configured to cause the light to turn on or off based on the result.

5. The system of claim 2 wherein the gate is at the passageway on the transit vehicle and the access-controlled area is the inside of the vehicle.

6. The system of claim 2, wherein the set of mesh nodes is distributed more densely around the gate compared to a region inside the access-controlled area.

7. The system of claim 2, wherein the gate is at a transportation platform and the access-controlled area is the platform.

8. A method for access tracking via a mesh network including (1) a set of mesh nodes disposed proximate to a passageway for entering or exiting a transit vehicle and (2) a master mesh node communicatively coupled to the set of mesh nodes, wherein the master mesh node is configured to determine whether a mobile device has become located near the passageway based on a strength of a signal received at one of the set of the mesh nodes from the mobile device and a validator is communicatively coupled to the master mesh node and a backend system, comprising:
   determining, by the validator, whether a user of the mobile device is entering the transit vehicle by:
   (1) receiving an indication from the master mesh node that the mobile device is near approaching the passageway, wherein the mobile device communicates and account information associated with the mobile device user, and the user account information is transmitted to the validator via an IoT network,
   (2) determining, based on the indication, whether the user of the mobile device is entering the passageway by applying detected signal strength values associated with the mobile device to a Kalman filter, and
   (3) transmitting a result of the determination of whether there is a be-in associated with the mobile device for the backend system to starting the computation of a transit fare for the user of the mobile device; and
   determining, by the validator, whether a user of the mobile device is exiting the transit vehicle by:
   (1) receiving an indication from the master mesh node that the mobile device is near the passageway, wherein the mobile device communicates and account information associated with the mobile device user, and the user account information is transmitted to the validator via an IoT network,
   (2) determining, based on the indication, whether the user of the mobile device is exiting the passageway by (i) applying detected signal strength values associated with the mobile device to a Kalman filter and (ii) applying a redundancy threshold to confirm that the user of the mobile device departed the vehicle, and (3) transmitting a result of the determination of whether there is a be-out associated with the mobile device for the backend system to determine a transit fare for the user of the mobile device.

9. The method of access tracking according to claim 8, wherein the mesh network additionally includes a set of mesh nodes disposed proximate a gate to an access controlled area, and the gate includes an electrically-controlled barrier, further comprising:

determining, by the validator, to cause actuation of the barrier to open or close based at least in-part on a result of determining whether a mobile device has become located near the gate based on a strength of a signal received at one of the set of the mesh nodes from the mobile device.

10. The method of access tracking according to claim 9, wherein the gate is at a transportation platform and the access-controlled area is the platform.

\* \* \* \* \*